United States Patent [19]

Auria et al.

[11] 3,860,917

[45] Jan. 14, 1975

[54] OPTICAL MEMORY DEVICE FOR WRITING IN AND READING FOR INFORMATION

[75] Inventors: Luigi D. Auria; Jean-Pierre Huignard, both of Paris, France

[73] Assignee: Thomas-CSF, Paris, France

[22] Filed: May 9, 1973

[21] Appl. No.: 358,545

[30] Foreign Application Priority Data

May 12, 1972 France .............................. 72.16999

[52] U.S. Cl. ......................... 340/173 LM, 350/96 R

[51] Int. Cl. ......................... G11c 11/42, G11c 13/04

[58] Field of Search ................. 340/173 LM; 346/74

[56] References Cited

UNITED STATES PATENTS 3,072,889 1/1963 Willcox ......................... 340/173 LM 3,148,355 9/1964 Sliter ............................ 340/173 LM 3,184,307 5/1965 Letzer ........................... 340/173 LM

*Primary Examiner*—Terrell W. Fears

*Attorney, Agent, or Firm*—Cushman, Darby & Cushman

[57] ABSTRACT

The present invention relates to the optical storage of information items upon a photosensitive support. The writing in of any group of N information items is performed by displaying these items with an array of N sources and by projecting images of said array onto M adjacent areas of the support. Shutter means are provided for selectively limiting the writing in to anyone of said areas. Read out is performed by selectively illuminating anyone of said areas and by projecting back an image thereof which is sensed by an array of N photoelectric elements. The shutter means remain fully open during read out.

10 Claims, 2 Drawing Figures

OPTICAL MEMORY DEVICE FOR WRITING IN AND READING FOR INFORMATION

Figures 1, 2:
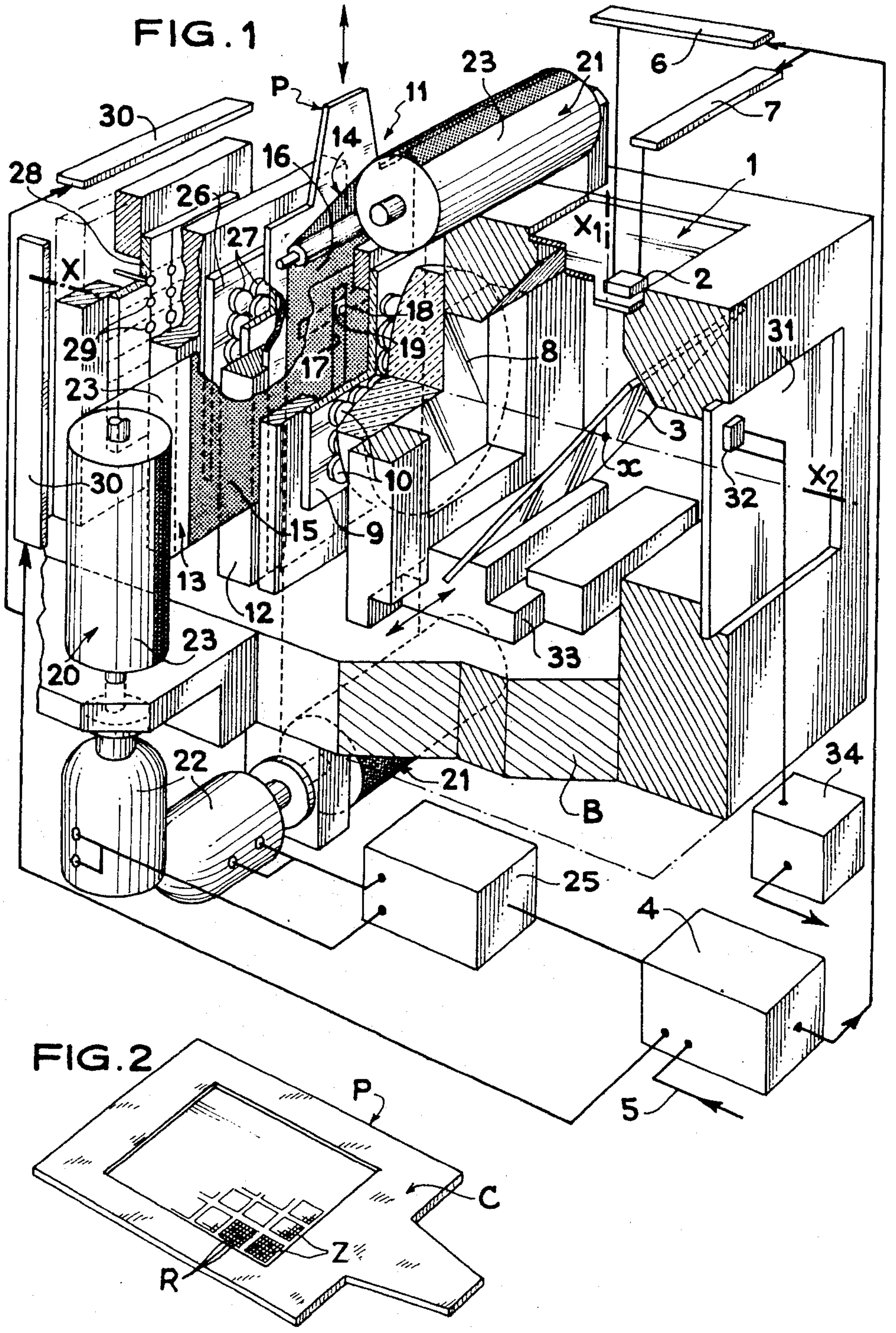

The present invention relates to the recording and read-out of optical data.

At the present time, in optical stores, recording substrates are used which are each constituted by a photosensitive plate or film upon which, by photographic means, binary data are recorded in the form of opaque and transparent zones. Each photosensitive plate, referred to as a "data plane," thus comprises a network of zones referred to as "pages" and each page, in turn, exhibits a network of elementary regions of very small size, opaque or transparent depending upon the nature of the information to be recorded. Thus, a "storage plane" may, for example, contain M "pages" and each "page" may comprise "N" regions, so that the total capacity of a storage plane is M × N.

At read-out, each "storage plane" is subjected to the effect of an array of $m$ lightsources, such as luminescent diodes, so that each source can illuminate a page of the storage plane. The light coming from a given source, passes through the storage plane and a matrix of M lenses each having a focal length of $f$. This matrix of lenses is followed by a projection lens of focal length F, which makes it possible to project, with a magnification of $G = F/f$, the image of an arbitrary page of the storage plane, onto a matrix of N photodetectors.

Thusfar, several devices are known, for recording these storage planes.

In a first of these known devices, an array of N separate light sources is provided, these being controlled as a function of digital data coming for example from a magnetic tape, a punched tape or the like, an image being formed with a magnification of 1/G, of this emissive array upon a photographic plate capable of translation in X and Y directions.

Thus, between the array of light sources and the photosensitive plate, a reducer lens is provided which makes it possible to achieve the desired enlargement, recording being carried out page by page.

The photosensitive plate should therefore be capable of displacement in accordance with M discrete positions with extreme positional accuracy, the translational pitch being equal to the pitch of the pages of the storage plane being recorded.

In a second known device, each page of the storage plane is manufactured from a matrix of M light sources controlled as a function of digital data and the image of which is produced upon a photosensitive plate translatable in X and Y directions.

In this case, the M light sources must have a dimension of $G \times t_b$ ($t_b$ being the dimension of an elementary data region in the storage plane), and be separated by an interval of $d = P_{page} \times G$, where $P_{page}$ is the pitch of the pages in the storage plane and $G$ is the magnification of the lens used.

Furthermore, the translation of the photosensitive plate should be produced with a positional accuracy which is even better than in the previous case, the translation pitch having to be equal to the pitch of the elementary data regions of each page.

Another drawback, inherent in the two devices described, consists of the fact that the distortion inevitably produced at the time of recording by the optical system, in the image of the photographic plate, are worsened, at read-out, by inherent distortion in the read-out device. The result is that incorrect read-out of the storage plane takes place, and errors are consequently inevitable.

The object of the invention is to overcome the drawbacks of the prior art recording devices.

In accordance with the present invention there is provided an optical memory device for writing in and reading-out information items consisting of M groups of N binary digits stored in a photosensitive support building up the data plane of said optical memory device, said device comprising: optical display means controlled by the information items pertaining to anyone of said groups for supplying a first pattern of optical data, multiple imaging means projecting onto said data plane M adjacent image of said first pattern, arranged for forming a further pattern of M adjacent storage areas, shutter means for selectively limiting to anyone of said storage areas, the writing in of said information items, photoelectric read-out means arranged in accordance with said first pattern, illuminating means arranged in accordance with said further pattern for selectively illuminating anyone of said storage areas, and optical reflecting means optically conjugating the sensitive face of said photoelectric read-out means with the emissive face of said optical display means.

Because of these characteristics, the device in accordance with the invention, in order to record and read-out the storage plane, utilises an optical trajectory which is virtually identical over the whole of its length, the light traversing this trajectory in opposite directions depending upon whether it is recording or reading-out which is involved. The result is that the optical elements pass the light in opposite directions so that their aberrations, which inevitably produce recording distortions, are compensated at read-out, the image produced in the storage plane thus being virtually free of distortion.

In addition, the storage plane is maintained in a fixed position and experiences no displacement transversely in relation to the optical axis. By contrast, the shutter means preferably comprise a diaphragm which translates parallel to the optical axis. However, this diaphragm can be manufactured using means having an extremely small mass. In addition, because of the fact that on the one hand the areas of the storage plane are in each case separated from the adjacent areas by a border which contains no information, and that on the other hand the shutter means have to selectively mask all the areas, with the exception of the one selected at a particular instant, the opening of said shutter means overlapping said zone. The result is that the positioning of the opening can be subject to a substantially lower degree of accuracy than that required in the prior art devices for the positioning of the storage planes.

For a better understanding of the present invention and to show how the same may be carried into effect, reference will be made to the ensuing description and the attached figures, among which:

FIG. 1 illustrates a schematic perspective view of an optical recording memory device in accordance with the invention, and FIG. 2 illustrates a perspective view of a detail of a recorded storage plane.

Referring first of all to FIG. 2, it will be seen that each storage plane has a frame C in which a photosensitive substrate, developed or otherwise, is located. After recording and development this substrate presents a matrix of data pages Z, each page comprising an array of non-uniform transparency regions R which constitute the binary data. It should be observed that in this figure the dimensions of the areas corresponding to the data pages Z and of the regions R, have been exaggerated simply in order to clarify the drawing.

Referring now to FIG. 1, it will be seen that the optical memory device in accordance with the invention, comprises a heavy base B which carries all the elements of the device in order to ensure the requisite optical stability to achieve suitable accuracy.

An array 1 with light sources 2 such as photoluminescent diodes, is assembled in said base, the light issuing from the array being projected onto the mirror 3. The centre X of this mirror coincides with the apex of an angle defined by a first optical axis $X—X_1$ indicated in broken-line, the mirror being inclined at 45° in relation to each section of said optical axis. The array 1, which is subdivided into columns and rows of light sources, can be selectively excited through the medium of a receiver device 4, which via an input 5 receives the digital data for recording. These data items stem, for example, from a punch card installation, a magnetic tape or the like.

The excitation of the array 1 of light sources 2 is achieved through two interface control units 6 and 7, of known kind, by means of which an arbitrary configuration of illuminated light sources can be produced as a function of input data, these illuminated sources then being capable of illuminating one of the areas of the storage plane being recorded.

An objective lens 8, arranged upon the optical axis $X—X_1$, receives the light from the mirror 3. It is located in front of a matrix 9 of lenses 10, also arranged upon the optical axis. This matrix is adjacent to shutter means 11 which make it possible to selectively form a retractable diaphragm, movable in a plane perpendicular to the axis $X—X_1$. A holder 12, in which storage planes P for recording or read-out can be inserted at will, is arranged in front of the shutter means 11.

The latter comprises two films 13 and 14, preferably produced after the development of a specially exposed photographic film. Each film comprises in particular an opaque zone 15 or 16, in which a transparent slot 17 or 18 of rectangular shape is left. The major axis of each slot 17 or 18 is perpendicular to the longitudinal axis of the film 15 or 16 corresponding to it, although some other arrangement could equally well be envisaged.

In the present instance, the slots 17, 18 intersect one another at a rightangle, and, as FIG. 1 shows, when partially superimposed form a square opening 19 the dimensions of which are slightly larger than those of an area Z of the storage plane P. Each slot thus has a length at least equal to the corresponding side of the storage plane, and a width slightly larger than an area of said plane.

The films 13 and 14 are wound respectively upon two pairs of rollers 20 and 21, one of the rollers of each pair being driven by an electric motor 22 and the associated roller being equipped with an elastic device for tensioning the film (not illustrated and known per se).

The films 13 and 14 can thus move in two contiguous planes, perpendicular to the optical axis $X—X_1$.

Each film furthermore comprises a transparent zone 23 which extends over the whole of its width and has a dimension at least equal to the corresponding dimension of the storage plane P.

Thusfar, it will have been realised that by judicious, coordinated movement of the two motors 22, it is possible to form a shutter or diaphragm 19 in front of any location of the storage plane P and that furthermore the shutter can be fully withdrawn by bringing the two transparent zones 23 into alignment with one another.

The motors 22 are connected to a control apparatus 25 which produces signals exciting the motors synchronously with the data arriving at the input of the receiver device 4. A second array 26 of collimating lenses 27 is arranged upon the optical axis $X—X_1$. It is designed to receive light from an array 28 of light sources 29 arranged in accordance with the areas Z of the storage plane and preferably constituted by electroluminescent diodes. They can be excited by interface control circuits 30, in a selective way, in order to illuminate each of the areas Z separately. The interface circuits receive their signals from the control device 4.

The mirror 3 is arranged upon a sliding support 33 which makes it possible to displace it and thus move it away from the optical axis $X—X_1$. Under these circumstances, the horizontal section thereof extends to form an axis $X—X_2$ upon which an array 31 of photodetectors 32 arranged in rows and columns in accordance with the regions R of an area Z of a storage plane P, is disposed. This array 31 is designed to pick up the binary data obtained by the projection of an area of a storage plane P already recorded, and to apply it to an output device 34. It will be seen, therefore, that the device in accordance with the invention can fulfill a dual function, that is to say both record and read-out storage planes.

The two processes will be described consecutively, herebelow.

RECORDING

To record a storage plane, in the holder 12 an unexposed storage plane, constituted by a photographic plate, is placed, the whole operation naturally being carried out in the dark.

The motors 22 are then started so that the opening of the diaphragm 19 is in front of the address "1" (at the top left for example) of the storage plane being recorded. The mirror 3 is maintained in the position illustrated.

The array 1 of light sources is then excited in accordance with the binary data introduced into the control device 4, so that a specific configuration of illuminated sources is produced. The light thus generated, after having been deflected by the mirror 3, passes through the lens 8 which operates as a reducer. The light then passes through the matrix of lenses 8 and the opening 10, and is incident upon the exposed area or page of the storage plane.

The array of light sources 1 remains illuminated for the requisite time to expose the photosensitive plate of the storage plane P, after which, the next page or area of the plane is recorded. To this end, the motors 22 are energised so that the shutter 19 is located opposite the address "2" of the storage plane, this address being located for example directly beside the previously recorded page. The array 1 of light sources 2 is then energised again, by another data word for recording, the light arriving at the storage plane and exposing the area of address "2" and so on.

When all the pages have been exposed in this way, it is merely necessary to develop the storage plane using a conventional technique, in order to retain the information.

READ-OUT

The recorded data can subsequently be read-out again using the same device. To this end, first of all the mirror 3 is moved away from the optical axis $X-X_1$ and an already recorded storage plane is inserted into the holder 12. The motors 22 are started so that the transparent zones 23 of the films coincide and are located in front of the storage plane P.

To read each page of this storage plane, it is then merely necessary to successively light up the light sources 28 of the array 29, and to pick up with the array of photodetectors 31, the data recorded in each corresponding page of the storage plane.

Self-evidently, to read a given page, it is not necessary first of all to read out the whole storage page. All that is required is to produce the illumination of the corresponding light source 29, to the exclusion of all the others in the array 28.

The light follows the reverse trajectory to that which it took at the time of recording. The light source 29 which is selected, projects light through a collimating lens 27 onto that page of the storage which is to be reproduced. This light passes through the shutter device 11, the matrix of lenses 9 and the lens 8, the latter this time producing magnification, and an enlarged image of the selected page of the storage plane is applied to the array of photodetectors 31.

A variant embodiment of the device consists in utilising, instead of the moving mirror 3, a fixed optical filter which is selective vis-a-vis the light issuing either from the light sources 2 in the case of recording, or from the light sources 29 in the case of read-out. In effect, it is possible to choose these sources to have different wavelengths of emission, so that in respect of one of them, the filter acts as a mirror and in respect of the other, it acts as a transparent element.

Through the agency of the invention, a device for recording and reading-out optical storages planes is obtained, which has considerable advantages over the prior art devices and, in particular, the following:

both during recording and during read-out, the holder 12 and the storage plane inserted therein, are fixed. Only the opening 19 scans the areas pertaining to the storage plane. However, since each area of the storage plane is separated from the adjacent areas by mutual bands which carry no information, the opening 19 can be located in front of the area without a great deal of accuracy at all being required; it is merely necessary for it to fully cover the area and this is something which is readily achievable, as already indicated, the opening having dimensions slightly larger than those of each zone of the storage plane.

the speed of recording can be increased, in view of the fact that the photographic films 13 and 14 have very small masses.

distortions at read-out are virtually eliminated. In effect, even if the recording of the pages has been carried out in such a way that distortion has been introduced by the optical elements of the device, the read-out of the data is carried out using the same elements in the reverse direction, this producing complementary distortions that cancel out those introduced at the time of recording.

Finally, it should be noted that the example described here, utilises electro-luminescent sources. It goes without saying that these sources could be of a different kind, for example light spots displaceable in X and Y directions, laser beams deflected in accordance with the two axes, and liquid-crystal or ferro-electric luminescent devices, addressed in a suitable manner.

What we claim is:

1. Optical memory device for writing in and reading-out information items consisting of M groups of N binary digits stored in a photosensitive support building up the data plane of said optical memory device, said device comprising: optical display means controlled by the information items pertaining to anyone of said groups for supplying a first pattern of optical data, multiple imaging means projecting onto said data plane M adjacent images of said first pattern arranged for forming a further pattern of M adjacent storage areas, shutter means for selectively limiting to anyone of said storage areas, the writing in of said informating items, photoelectric read-out means arranged in accordance with said first pattern, illuminating means arranged in accordance with said further pattern for selectively illuminating anyone of said storage areas, and optical reflecting means optically conjugating the sensitive face of said photoelectric read-out means with the emissive face of said optical display means.

2. Optical memory device as claimed in claim 1, wherein said shutter means comprise masking means building up an exposure window and translation means for displacing said exposure window along two distinct directions substantially parallel to said data plane.

3. Optical memory device as claimed in claim 2, wherein said masking means build up during the writing in phase an exposure window surrounding anyone of said storage areas; said masking means further building up during the reading-out phase a window having an aperture at least equal to the portion of said data plane covered by all said storage areas.

4. Optical memory device for writing in and reading-out information items consisting of M groups of N binary digits stored in a photosensitive support building up the data plane of said optical memory device, said device comprising: optical display means controlled by the information items pertaining to anyone of said groups for supplying a first pattern of optical data, multiple imaging means projecting onto said data plane M adjacent images of said first pattern arranged for forming a further pattern of M adjacent storage areas, shutter means for selectively limiting to anyone of said storage areas, the writing in of said informating items, photoelectric read-out means arranged in accordance with said first pattern, illuminating means arranged in accordance with said further pattern for selectively illuminating anyone of said storage areas, and optical reflecting means optically conjugating the sensitive face of said photoelectric read-out means with the emissive face of said optical display means; said optical reflecting means comprising a retractable mirror; said mirror being retracted during one of the writing-in and reading-out phases.

5. Optical memory device for writing in and reading-out information items consisting of M groups of N binary digits stored in a photosensitive support building up the data plane of said optical memory device, said device comprising: optical display means controlled by the information items pertaining to anyone of said groups for supplying a first pattern of optical data, multiple imaging means projecting onto said data plane M adjacent images of said first pattern arranged for forming a further pattern of M adjacent storage areas, shutter means for selectively limiting to anyone of said storage areas, the writing in of said informating items, photoelectric read-out means arranged in accordance with said first pattern, illuminating means arranged in accordance with said further pattern for selectively illuminating anyone of said storage areas, and optical reflecting means optically conjugating the sensitive face of said photoelectric read-out means with the emissive face of said optical display means; said optical reflecting means comprising a fixed transparent plate carrying a selective optical filtering layer; said layer allowing the reflection of the radiation emerging from one of said optical display and illuminating means, and said layer simultaneously allowing the transmission of the radiation of distinct wavelength emerging from the other of said last mentioned means.

6. Optical memory device for writing in and reading-out information items consisting of M groups of N binary digits stored in a photosensitive support building up the data plane of said optical memory device, said device comprising: optical display means controlled by the information items pertaining to anyone of said groups for supplying a first pattern of optical data, multiple imaging means projecting onto said data plane M adjacent images of said first pattern arranged for forming a further pattern of M adjacent storage areas, shutter means for selectively limiting to anyone of said storage areas, the writing in of said informating items, photoelectric read-out means arranged in accordance with said first pattern, illuminating means arranged in accordance with said further pattern for selectively illuminating anyone of said storage areas, and optical reflecting means optically conjugating the sensitive face of said photoelectric read-out means with the emissive face of said optical display means; said optical display and illuminating means comprising electro-luminescent diodes respectively arranged along said first and further patterns.

7. Optical memory device as claimed in claim 2, wherein said masking means comprise two opaque films; each of said film including a transparent slot; said films being slidably mounted for respectively displacing along said distinct directions; each slot being elongated and oriented in relation to the other slot for building up said exposure window.

8. Optical memory device as claimed in claim 7, wherein said slots are rectangular; the width of said slots being slightly larger than that of anyone of said storage areas; the length of said slots being slightly larger than the dimensions of the portions of said data plane carrying all said storage areas.

9. Optical memory device as claimed in claim 7, wherein each of said films further comprise a transparent zone extending along the whole dimensions of the portion of said data plane carrying all said storage areas; the transparent zone of one of said films being brought into coincidence with the transparent zone of the other of said films during the reading-out phase for completely withdrawing said exposure window.

10. Optical memory device as claimed in claim 1, wherein said multiple imaging means comprise an objective lens cooperating with a plurality of coplanar lenses distributed in accordance with said further pattern; said illuminating means comprising an array of coplanar lenses distributed in accordance with said further pattern.

* * * * *